March 13, 1928.  
R. L. TULLIS  
CELLULOSE BIRD CAGE  
Original Filed Feb. 19, 1924   2 Sheets-Sheet 1
1,662,687
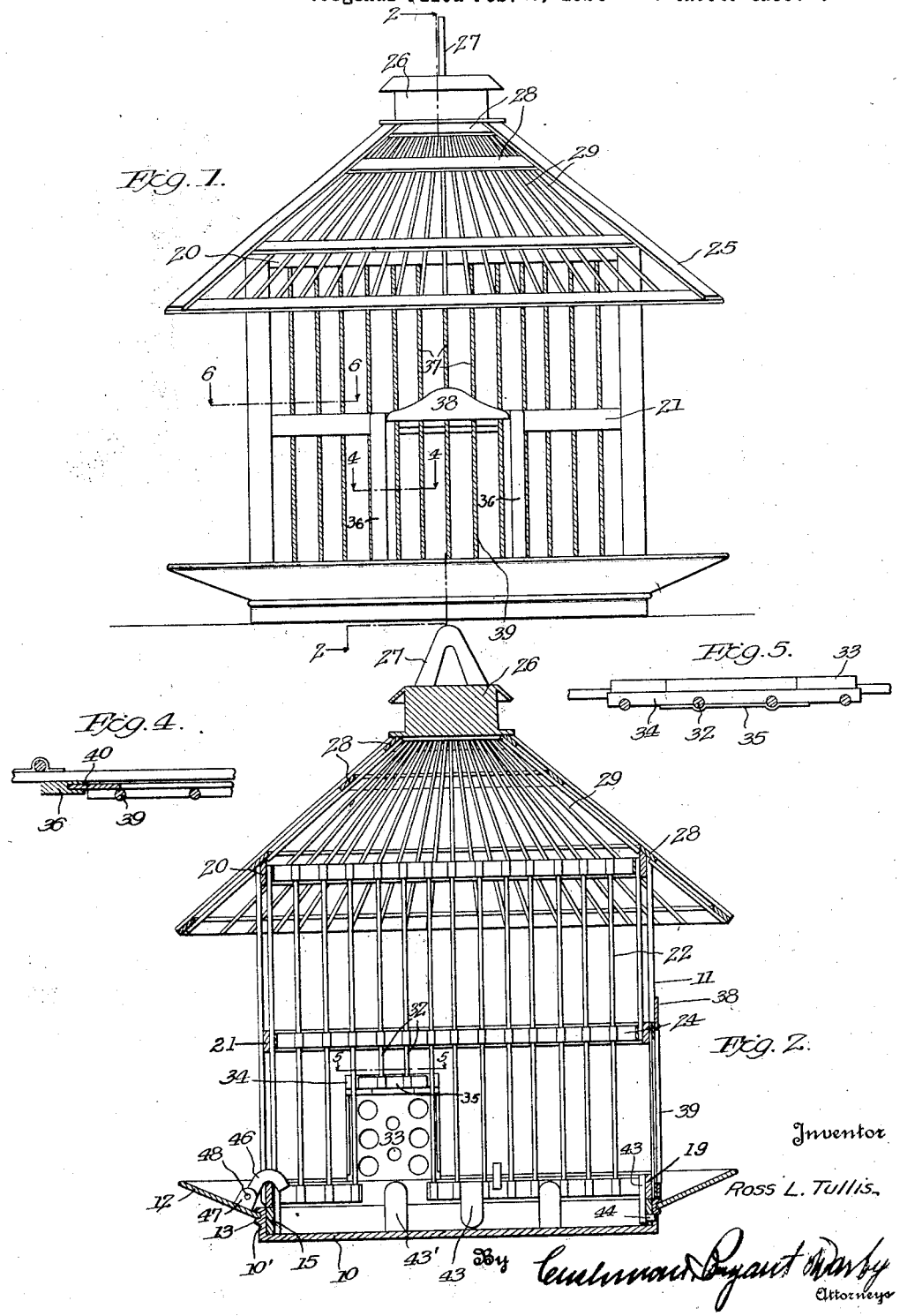
Inventor  
Ross L. Tullis

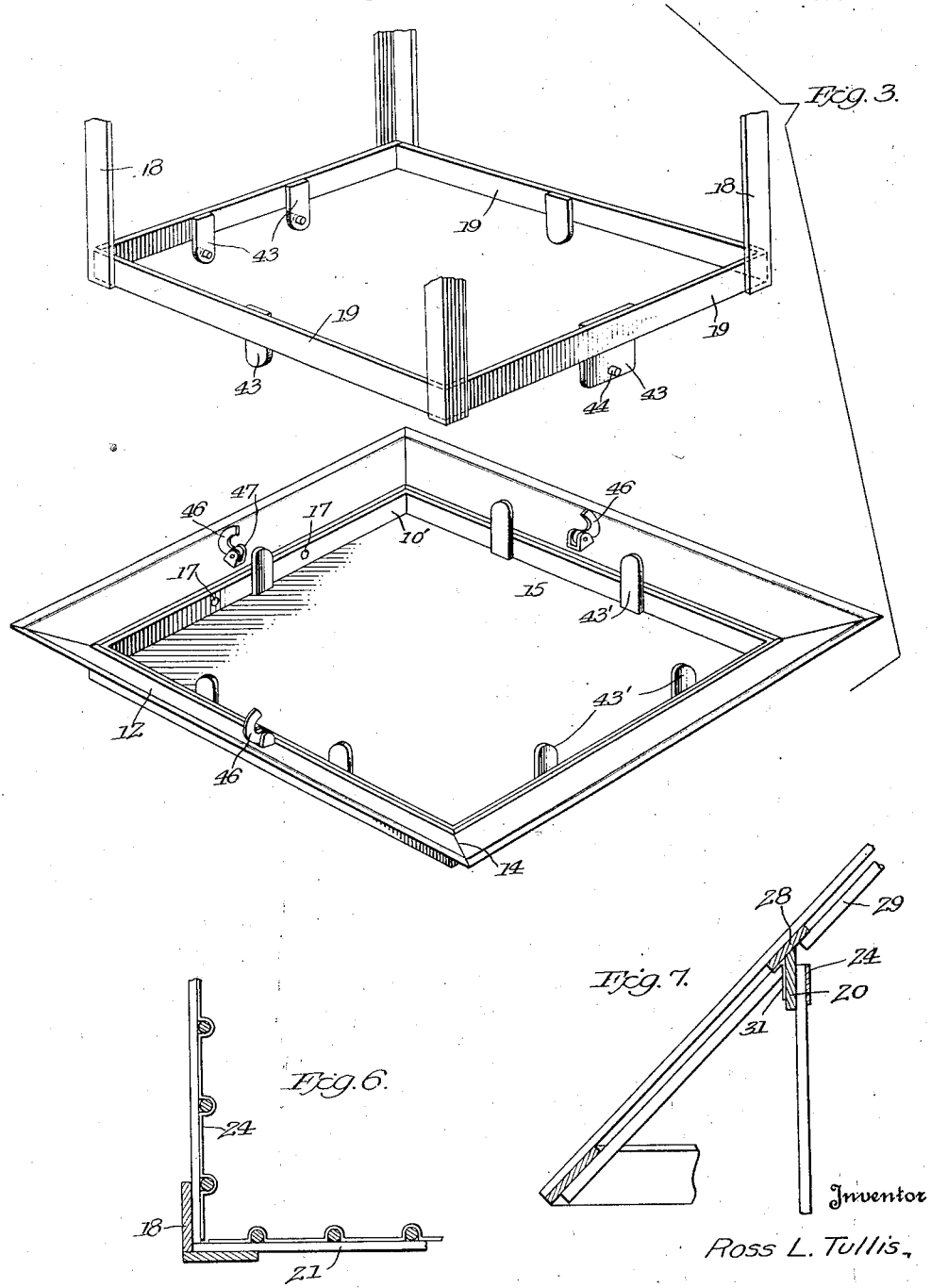

Patented Mar. 13, 1928.

1,662,687

UNITED STATES PATENT OFFICE.

ROSS L. TULLIS, OF NEW HAVEN, CONNECTICUT.

CELLULOSE BIRD CAGE.

Continuation of application Serial No. 693,828, filed February 19, 1924. This application filed March 19, 1926. Serial No. 96,076.

The present invention relates to cages, and more particularly to a bird cage intended for household use.

An object of the invention is to provide a bird cage which is of pleasing appearance, and which may be cheaply manufactured.

Another object is to furnish a bird cage of a sanitary character which can be easily and thoroughly cleansed by washing with soap or other suitable detergent, which is light in weight, incorrodible, strong and durable, and withal especially attractive in appearance. As regards the appearance of the cage, it is aimed more particularly to enhance its attractiveness by the use of contrasting coloration in the rails or bands, upright rods, or wirelike elements, and other parts of which the cage is constituted, without the necessity of employing paint or other coating which can be picked off by the bird, and which when so picked off is likely to cause poisoning.

Further, it is proposed not only to increase in a very substantial degree the ease with which the cage can be cleaned and kept in a clean, sanitary condition, but also to enhance its appearance by the use of a material combining high luster with translucency.

Again, it is aimed to furnish a bird cage in which the body is formed to a large extent, of a multiplicity of attenuated, flexible, wirelike bird-confining elements providing for light and air, and having the necessary strength and permanency, and yet constructed wholly of cellulose esters material, so as to obtain the additional advantages above noted.

A still further object of the invention is to provide a bird cage constructed entirely from one of the cellulose esters, such stock as is known by the trade names of pyralin, celluloid, fiberloid, and visculoid being suitable for the purpose.

The present application is a continuation of my pending application Serial No. 693,828, filed Feb. 19, 1924.

The above and other objects of the invention will become apparent as the description proceeds in connection with a preferred embodiment shown in the accompanying drawings, wherein:

Figure 1 is a side elevational view.

Figure 2 is a vertical section on the line 2—2 of Figure 1, looking in the direction of the arrows.

Figure 3 is a detail view showing the connections between the cage structure proper and the bottom or base.

Figure 4 is a detail sectional view on the line 4—4 of Figure 1.

Figure 5 is a detail sectional view on the line 5—5 of Figure 2.

Figure 6 is a sectional detail view on the line 6—6 of Figure 1, and

Figure 7 is an enlarged detail view showing the connection between the top and the side walls of the cage structure.

Referring to the drawings for a more detailed description, 10 indicates, generally, the base or bottom, and 11 the body portion or the cage structure proper, which is detachably connected to the bottom. The entire device is preferably made from a cellulose ester, any of the cellulose plastics being suitable for this purpose. By cellulose ester is meant any of the products, such as pyralin, celluloid, fiberloid, visculoid, or any of the cellulose nitrate or acetate compounds. I mention particularly celluloid, for, as is well known, this and other cellulose ester materials mentioned contain either camphor (natural or synthetic) or a camphor substitute. One advantage of such materials is that the camphor by its continuous volatilization has the effect of keeping away vermin. This material can be readily manufactured in sheet, bar and strip form, and may be produced in a variety of colors. Moreover, it is extremely sanitary, can readily be washed with any soap or grease solvent, does not corrode, as will metal, and is harmless if pecked by a bird, whereas the paint used in the manufacture of metal cages is frequently poisonous. Moreover, the material is translucent, and, in many instances, transparent, thus affording proper light for the bird.

Again, a material of this character takes a finish of a very high luster and may be provided with a hard surface, as by polishing or treating with chemical compounds, such as acetone or diacetone. So far as I am aware, it has never been heretofore proposed to construct cages from a cellulose compound and the advantages which I have discovered by the actual use of cages made from the materials specified have never heretofore been recognized.

Referring to the particular structural details of the preferred embodiment of the invention disclosed, the base 10 is formed with a centrally dished portion having vertical side walls 10' and a flange 12, which is fitted into a groove formed by projecting ribs 13 upon the vertical wall 10'. The flange serves to maintain the shape of the base and is preferably constructed of a number of sections which are united at their abutting ends 14 by the use of suitable cementing or fusing solvent to provide a base of a very rigid construction. The side walls 10' may be strengthened by a facing strip 15, which, together with the side walls, may have formed therein suitable sockets or openings 17, serving to co-operate with complemental connecting means upon the cage structure.

The cage structure 11 comprises sides having a frame work, which includes uprights 18, angular in cross section and forming the corners of the cage. The uprights are connected by horizontal frame pieces or rail members 19 extending between the lower extremities of the uprights. These frame pieces parallel supplemental horizontals or rail members 20 which similarly connect the upper ends of the uprights and if desired, intermediate horizontals 21 may be employed. The uprights and horizontals constitute the frame work of the side walls and are united by the use of a suitable solvent or cement, which, when applied to the meeting parts, serves to fuse together such parts, and effect direct adhesion. Although a particular form of frame is described, it will be understood that this may vary considerably, and that by the term "frame," when employed as distinguished from the bars, is meant any support or reinforce for the bars serving to unite the bars into a cage structure. From another aspect, as defined in some of the claims, the bars and rails together constitute a cage frame. The solvents are well known in the art, and the manner of their application need not be described in detail. The sides of the cage are completed by bars 22, which extend between the upper and lower horizontals 19, 20, and are secured to these horizontals and to the intermediate horizontals 21 in any suitable manner. In the particular construction being described, the bars are united with the horizontals by the use of a solvent and by comparatively thin binding strips 24 made from cellulose stock and extending across the bars. The bars are preferably of round cross-section and of small diameter, and a multiplicity of them are employed so as to produce a cage body whose wall includes evenly spaced, attenuated, quite flexible elements that are wirelike in size and shape, although in fact consisting of cellulose esters rather than metal. The binding strips are cemented or fused to the horizontals between the bars so that they tightly engage the bars, as indicated clearly in Figure 6. Obviously, the binding strips 24 may be substantially continuous so as to extend across a comparatively large number of bars, or, if desired, separate pieces may be employed for joining each bar to the horizontal.

In the present instance, the top of the cage structure is formed with a separate frame, although obviously, this is not necessary. The top is of pyramidal form and includes corner frame strips 25, which converge toward a top block 26 provided with a loop 27, by means of which the cage may be suspended. Horizontally extending transverse strips 28 extend between the corner pieces 25, to which they are cemented and attenuated, wirelike elements 29 similar to the elements 22 diverge from the block 26 to the lower edge of the top and are suitably joined to the transverse strips by solvent, and if desired, by a binding, such as the binder 24, serving to unite the side bars to the frame structure.

The top structure is joined to the side frame structure by constructing the two in such relative dimensions that the horizontals 28 of the top will rest upon the horizontals 20 of the side frame. And joining pieces 31 (Figure 7) are cemented to the engaging parts, thereby uniting the top and sides of the cage.

It is desirable, of course, to provide one or more doors in a device of this character. For this purpose, one inlet opening may be formed by terminating a number of the bars 32 (Figure 2) a short distance above the lower horizontal 19 to form an opening in the side of the cage. A closure 33 is positioned over this opening and is held in position by a relatively short piece 34 of cellulose stock (Figure 5) united to the bars by a binding strip 35 and to which the closure is hinged. An additional sliding closure may also be provided, as indicated in Figure 1. Vertical guide posts 36 are cemented or otherwise united to the cage and the bars 37 are terminated at the intermediate horizontal 21 to provide an opening below the same. A sliding closure 38 provided with a plurality of bars 39 has its sides 40 fitting into the guide post 36 so that it may be freely raised and lowered.

The cage proper may be detachably connected to the bottom by any suitable means. For this purpose, depending lugs 43 are positioned upon the bottom horizontals 19 and carry pins 44 which project outwardly and are adapted to fit into the sockets or openings 17 in the side wall 10' of the bottom. It will be understood that the frame horizontals 19 being made from relatively thin cellulose stock may be suitably flexed intermediate the uprights to permit the pins 44 to be sprung into and out of the openings 17. Complementary lugs 43' project upwardly from the bottom and being preferably on opposite sides of the lugs 43 engage the horizontals in order to prevent accidental flexing of the same and the resulting withdrawal of the pins 44 from their respective sockets in the bottom 10. Additional connecting means in the form of hooks 46 may be positioned upon the bottom in suitable yokes 47 carrying pivot pins 48 so that the hooks may be swung inwardly over the horizontals 19 of the frame structure. By this arrangement, the cage structure proper and the bottom may be readily associated or taken apart for the purpose of cleaning the cage and when connected by the means described are not liable to be separated accidentally.

It will be noted that the structure described comprises three parts, namely, a bottom, sides and a top, which may be separately constructed and then assembled. This permits the firm joining of the various elements or each part before the assembly of the entire cage. It will be understood, however, that the invention is not limited to this arrangement, which, while useful, is not the essence of the invention.

In selecting the plastic compounds for the construction of the cage, it is desirable to have the parts of contrasting colors, and, as will be noted in the drawings, the frame structure and the bottom are white, while the bars are lined for green. While only a number of the bars have been so lined, it will be understood that all or only a portion of the same may be of this or other colors. Cellulose materials, when heated, can be pressed or otherwise formed to any desired shape, and by reason of the fact that, as stated, they can be readily washed, and in manufacture may be given a higher luster and hard surface finish, they are particularly adaptable to the manufacture of a bird cage. Moreover, as the stock may be readily shaped, cages of any desired form may be constructed. Owing to the extent to which the cellulose esters material can be shaped and bent, and the possibility of securing the parts very permanently by direct adhesion to other parts, the cage can be more readily made in a satisfactory form and character than if constructed of wood, and it has the advantages over both wood and metal which have been previously mentioned. While not possessing the strength of the metal cage it can be constructed with comparable facility, and it has been found that the thin rods or elements simulating the wires of the metal cages can be produced and used practically in the production of cages, and that when so employed they combine a large degree of flexibility with quite sufficient strength, ruggedness, and permanency for the use to which they are put. Such cages offer surprising resistance to hard knocks and rough usage, and as commercially manufactured exhibit an utter lack of that fragility which might be expected from their lightness of weight.

It should be understood that where I employ the term "camphor" throughout the specification and claims in referring to the ingredients of the cellulose ester stock, I intend to include not merely camphor, natural or synthetic, but any substitute for camphor such as triacetone, diethyl phthalate, manol and the like.

With the understanding that such modifications may be made in the article shown and described as properly come within the scope of the invention defined by the following claims, what I claim is:

1. A bird cage having a frame structure formed from cellulose ester stock with the parts thereof secured together by direct adhesion, and bars of a cellulose ester secured to said frame parts.

2. A bird cage provided with a body portion comprising spaced rail pieces and bars extending at right angles to the rail pieces and secured thereto, said rail pieces and bars being formed of cellulose ester materials and being secured together by direct adhesion of the cellulose ester materials.

3. A bird cage provided with a body portion comprising vertically spaced rail pieces and uprightly disposed bars, said rail pieces and bars being formed of cellulose ester materials united by direct adhesion, and binding strips of a cellulose ester extending across the said bars and united to said rail pieces between the bars by direct adhesion.

4. A bird cage provided with a body portion including a frame and bars constructed substantially entirely from cellulose ester material with a camphor ingredient.

5. A device of the class described comprising a bottom, a cage structure including uprights and horizontal frame pieces connecting said uprights, and pin and socket means for detachably connecting the bottom and the cage structure, said means comprising a depending lug on one of said horizontal frame pieces, a pin projecting outwardly from said lug adapted to be received by a suitable socket on said bottom, the frame piece being yieldable to permit the insertion and withdrawal of said pin, and upstanding means on said bottom engaging the said horizontal frame piece to maintain the pin in said socket.

6. A bird cage for household use having a side wall including upper and lower rails, a multiplicity of vertical wirelike elements of small diameter interconnecting said rails, said rails and wirelike elements being formed of cellulose esters material, said wirelike elements lying in contact with the inner faces of said rails, binding strips of cellulose esters material extending along the inner faces of said rails across said wirelike elements and united to said rails by direct adhesion between the wirelike elements so as to form a one piece structure, a suspension tip at the top of the cage and a structure connected with said tip comprising a multiplicity of downwardly and outwardly diverging wirelike elements of cellulose esters material located above the upper rail, and means for securing said last named wirelike elements to said upper rail by direct adhesion of the cellulose esters material so that said wirelike elements are in one piece with the side wall.

7. A one piece bird cage body frame having rails and wireform elements consisting of cellulose esters having a camphor ingredient and fused together.

In testimony whereof I have hereunto set my hand.

ROSS L. TULLIS.